US008540209B2

(12) United States Patent
Hensel et al.

(10) Patent No.: US 8,540,209 B2
(45) Date of Patent: Sep. 24, 2013

(54) ACTIVE COMBUSTION FLOW MODULATION VALVE

(75) Inventors: John Peter Hensel, Morgantown, WV (US); Nathaniel Black, Bethel Park, PA (US); Jimmy Dean Thorton, Morgantown, WV (US); Jeffrey Stuart Vipperman, Pittsburgh, PA (US); David N. Lambeth, Pittsburgh, PA (US); William W. Clark, Wexford, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 188 days.

(21) Appl. No.: 13/233,659

(22) Filed: Sep. 15, 2011

(65) Prior Publication Data

US 2012/0061596 A1   Mar. 15, 2012

Related U.S. Application Data

(60) Provisional application No. 61/383,054, filed on Sep. 15, 2010.

(51) Int. Cl.
  *F16K 31/08* (2006.01)
(52) U.S. Cl.
  USPC ........................................ 251/65; 251/129.05
(58) Field of Classification Search
  USPC ................. 251/65, 129.05, 129.08, 129.21, 251/129.15
  See application file for complete search history.

(56) References Cited

U.S. PATENT DOCUMENTS

| 3,125,321 | A | * | 3/1964 | Van Domelen | 251/129.21 |
| 4,638,973 | A | * | 1/1987 | Torrence | 251/129.02 |
| 6,158,713 | A | * | 12/2000 | Ohya et al. | 251/65 |
| 6,983,923 | B2 | * | 1/2006 | Fukui et al. | 251/65 |
| 7,726,524 | B2 | * | 6/2010 | Merabet et al. | 222/504 |
| 8,240,636 | B2 | * | 8/2012 | Smith | 251/129.19 |
| 2010/0140520 | A1 | * | 6/2010 | Millius | 251/129.15 |
| 2012/0132836 | A1 | * | 5/2012 | Cadeau et al. | 251/65 |

* cited by examiner

*Primary Examiner* — John K Fristoe, Jr.
*Assistant Examiner* — Umashankar Venkatesan
(74) *Attorney, Agent, or Firm* — Eckert Seamans Cherin & Mellott, LLC; Stephen A. Bucchianeri

(57) ABSTRACT

A flow modulation valve has a slidably translating hollow armature with at least one energizable coil wound around and fixably attached to the hollow armature. The energizable coil or coils are influenced by at least one permanent magnet surrounding the hollow armature and supported by an outer casing. Lorentz forces on the energizable coils which are translated to the hollow armature, increase or decrease the flow area to provide flow throttling action. The extent of hollow armature translation depends on the value of current supplied and the direction of translation depends on the direction of current flow. The compact nature of the flow modulation valve combined with the high forces afforded by the actuator design provide a flow modulation valve which is highly responsive to high-rate input control signals.

22 Claims, 6 Drawing Sheets

ACTIVE COMBUSTION FLOW MODULATION VALVE

CROSS REFERENCE TO RELATED APPLICATIONS

This application claims priority to U.S. provisional application No. 61/383,054 filed Sep. 15, 2010, entitled "Active Combustion Flow Modulation Valve", the contents of which are incorporated herein by reference.

STATEMENT OF GOVERNMENTAL SUPPORT

This invention was made with government support under grant # DE-AC26-04NT41817 awarded by the NETL/DOE. The government has certain rights in the invention.

TECHNICAL FIELD

A flow modulation valve having a slidably translating valve stem, arranged such that the position of one end of the valve stem relative to the valve seat defines a flow area through which a fluid flow is modulated at high frequency. The flow modulation valve utilizes an arrangement where a sliding valve stem surrounds a hollow stem support and flow is directed through the stem support before passing between the valve face and the valve seat. This provides a flowpath where radial forces on the valve stem arising from fluid pressure are balanced and increased sliding friction between the valve stem and the stem support is avoided. Additionally, the flow arrangement avoids impinging flows on the valve face, reducing the force requirements for rapid actuation of the valve stem. The valve stem is slidably transposed for high frequency flow modulation using a moving coil actuator to minimize response time. One specific embodiment of the present invention is intended for service in high temperature and high pressure applications, such as variable throttling of flow distribution on multiple burners to control combustion instability in low-emission gas turbines. The compact nature of this embodiment combined with the high forces afforded by the actuator design provide a flow modulation valve which is highly responsive to high-rate input control signals.

BACKGROUND OF THE INVENTION

The present invention relates to a rapid-acting flow modulation valve designed to modulate a fluid flow in response to an externally supplied control signal commanding at an extremely high rate. The flow modulation valve incorporates pressure balanced throttling components, a fast-acting coil actuator, low hysteresis movement, and an energy-dense magnetic geometry in order to produce high frequency flow modulation in response to input drive signals. The flow modulation valve may be utilized for applications requiring readily amenable retrofitting, small diameter working fluid lines, high operational frequency, strict controllability, and low production and maintenance cost, among other advantages. An embodiment of the flow modulation valve is designed to operate in high temperature, high line pressure environments where rapid flow modulation is advantageous or required, such as gas turbine active combustion control systems, variable valve timing engines, or other applications requiring high speed throttling operations.

Throttle valves are used in industry in a variety of applications requiring control of fluid flow. The majority of these applications require throttling valve action at a relatively low speed, often in a stepwise manner, and at relatively low temperatures and pressures. A number of suitable valves have been developed for the relatively slow, lower temperature and pressure applications, including globe valves, gate valves, and various rotary-type valves. The operating mechanics of low-frequency, precise throttling operations are well developed and understood.

Development of higher frequency flow modulation applications, however, presents additional challenges. Higher frequencies obviate manual valve actuation, and the hydrodynamic interaction between moving valve parts and the throttled flow demands careful evaluation of the flow structure throughout the valve. Simplicity of operation also plays a much more significant role, as the higher frequencies desired demand that valves provide throttling actions over a much shorter response time. As a result, the requirement for synergy between all components involved in the execution of a throttling action is much greater than with a low frequency valve application, and high frequency flow modulating valves must be developed and optimized as a whole system to a much greater degree.

Some methods of high frequency modulation utilize smaller valves having extremely short open/shut switching times. These two-position valves operate in a digital mode rather than proportional analog valves, and are driven by a pulse-width modulated control signal for quasi-analog operation. Precise flow control can be achieved by configuring multiple digital valves into assemblies, where successive valves in the assembly may have differing flow capacity. Valve operation in this technique is binary in nature with only an open or closed state. See, e.g., Cornwall et al, U.S. Patent Application Publication 2007/0151252, published Jul. 5, 2007. A variation on the digital valve technique utilizes rotating discs that align flow orifices on each disc at a specified frequency. These devices likewise operate by utilizing a digital mode to accomplish quasi-analog high frequency flow modulation. See, e.g., U.S. Pat. No. 7,114,336, issued to Hommema et al., Oct. 3, 2006. These approaches have achieved some success, however the use of digital combinations to approximate a desired analog characteristic generates inherent inaccuracies and typically requires microprocessor control. Additionally, the on/off injection methodology is unable to modulate both the amplitude and the phase of a fuel injection, unlike a proportional injection methodology. Additionally, general size and high pressure and temperature effects on the mechanism may prohibit operations in applications where a small footprint and large variation in thermal stresses become significant. In some applications, it would be advantageous to provide a fast-acting, high frequency flow modulation valve that utilizes proportional control, rather than various digital combinations, to affect flow modulation about a mean rate.

Other methods of high-frequency flow modulation rely on rapid actuation of spool valves. Typically, a source signal is conditioned by a servo controller and then amplified by a power amplifier. The spool moves axially in response to the signal producing a spool displacement. The spool displacement is measured by a transducer, which feeds this signal back to the servo controller. This simple control method produces spool motion which is proportional to an electrical signal input, and the flow magnitude is related to the spool displacement. However, in order to achieve an adequate degree of flow modulation with a short response time, the spools typically control multiple flow passages to increase the flow rate achieved with shorter strokes. This increases the necessary size of the spool. As a result, for high frequency and large flow rate applications, the force and power required of the actuator in order to stroke the spool becomes significant, and single stage spool valves can become impractical in terms of size and valve geometry. Efforts toward high frequency spool valve operation are typically geared toward reduction of the force requirement necessary for rapid spool movement. See for example U.S. Pat. No. 5,460,201 issued to Borcea et al., Oct. 24, 1995, among others. For these reasons, in many applications, a valve where sufficient throttling is achieved through manipulation of a single flow restriction, in order to reduce the necessary mass of the moving component and thereby reduce the response time of the valve for a given value of actuator force provided, may be desired. Further, such an arrangement could avoid the high differential pressures developed from low pressure ports to high pressure ports in spool valves, greatly reducing concerns over maintaining hydraulic balance in the operating environment so that higher frequency capabilities are not degraded.

Successful high frequency flow modulation also clearly requires an actuator sufficient to drive valves to high frequency operation. Magnetic stroke actuators are often utilized, although alternate actuator principles exist. The high frequency operation levies a general requirement that the actuator perform adequately in a direct drive configuration. Direct drive here means that there is no amplification of an electrical command signal required in order to affect valve movement. This avoids the limited bandwidth experienced by many lower frequency valves, which trade-off the increased response time generated by signal amplification in order to take advantage of lower power electrical command signals. In direct drive systems, conversely, a single, directly controlled system develops the force necessary to shuttle the valve. In addition to increasing the response, this approach also simplifies the internal component arrangement. However, generating the energy density and force necessary to achieve a desired bandwidth for a given device size with a direct drive arrangement is a formidable challenge. In some cases, the force required to accelerate the valve mass can be high, and physically large electromagnetic actuators may be required. Additionally, impinging flows on the throttling elements of the valve add additional actuator force requirements, further increasing the size of the actuator. In applications where the overall size of the high frequency flow modulator is a concern, lower mass moving components and an internal flow geometry minimizing impinging flow on the throttling components offer an advantage.

Additionally, a high frequency flow modulating valve designed for compactness of the overall mechanism may generate pressure and temperature concerns, depending on the operating environment. A high frequency valve designed to optimize actuator capabilities, reduce valve mass, and minimize overall valve size may be subject to tight tolerances between components. In high temperature environments, disregard of differing thermal characteristics among valve components may significantly alter these tolerances, producing drastic effects on the operational frequency obtainable from moving components. Similarly, differing expansion characteristics may induce stresses that significantly reduce operational lifetime. These effects can become highly significant if the valve assembly is subject to large thermal cycles. For example, a gas turbine flow modulation valve may be at ambient temperature during shutdown or maintenance, and subsequently experience rapid heat-up and operation at temperatures exceeding 600° F. due to turbine fuel preheat. This concern may be particularly pertinent in flow modulation applications for control of combustion instability. In such applications, the resonant responses and time delays of the fuel system between the modulating valve and the combustion turbine must be carefully evaluated, and reducing or eliminating the downstream fuel system is the best way to achieve control authority. However, this may not be possible for many existing actuators, because the actuators are too sensitive for reliable and consistent operation in the high temperature environment that exists in close proximity to the combustion turbine. As a result, in applications where significant thermal cycling is expected, the thermal characteristics of the valve components, in terms of material utilized, component geometry and the resulting impact on actuator sensitivity, becomes a highly significant factor.

The manner in which fluid pulses are integrated into the fluid flow in order to produce the flow modulation also has significant impact. Often the techniques utilize a pilot flow and a main flow. Flow pulses are generated in the pilot flow using an applicable technique, and the pilot flow and the main flow are then combined. This generates a fluid pulsation occurring generally about the main flow rate. The necessity to combine multiple flowpaths in this arrangement adds to the footprint of the flow modulator, and can preclude use in situations where space constraints apply. Additionally, the required amplitude of modulation required in the pilot flow may be significant, depending on the relative magnitudes of the pilot flow and the main flow. This may dictate longer valve strokes for adequate pilot flow pulsation, and the inertia of moving parts over the stroke can reduce the actuator's responsiveness. In some applications, it would be advantageous to utilize a valve assembly designed to transfer the full mass flow rate of fluid and introduce the pulsation directly, without the need for superposition.

Accordingly, it is an object of the present invention to provide a rapid-acting, compact, high frequency flow modulation valve optimizing the interactions among all components involved in the execution of a throttling action, by utilizing a unique synergy between the valve actuator, moving and fixed valve components, and hydrodynamic interactions between the throttled flow and the valve.

Further, it is an object of the present invention to provide a rapid-acting, compact, high frequency flow modulation valve that utilizes traditional flow restriction characteristics, rather than various digital combinations, to affect flow modulation about a mean rate.

Further, it is an object of the present invention to provide a rapid-acting, compact, high frequency flow modulation valve that reduces the necessary mass of the moving components and thereby reduces the response time of the valve for a given value of actuator force provided.

Further, it is an object of the present invention to provide a rapid-acting, compact, high frequency flow modulation valve that minimizes hydraulic imbalances on moving components in the operating environment, so that higher frequency capabilities are not degraded.

Further, it is an object of the present invention to provide a rapid-acting, compact, high frequency flow modulation valve that provides an internal flow geometry which minimizes impinging flows on the throttling elements of the valve, further reducing the response time of the valve for a given value of actuator force provided.

Further, it is an object of this disclosure to provide a rapid-acting, compact, high frequency flow modulation valve providing a geometry compatible with the thermal characteristics among valve components, so that temperature cycles encountered during normally expected operation do not degrade necessary physical tolerances, induce stresses that significantly reduce operational lifetime, or drive actuator sensitivity below useful levels.

Further, it is an object of the present invention to provide a rapid-acting, compact, high frequency flow modulation valve designed to transfer the full mass flow rate of fluid and introduce flow pulsations directly on the full mass flow rate, without the need for superposition of a pulsed pilot flow.

These and other objects, aspects, and advantages of the present invention will become better understood with reference to the accompanying description and claims.

SUMMARY OF INVENTION

The disclosure herein provides a flow modulation valve having attributes designed to make it highly responsive to input drive signals. The assembly incorporates pressure balanced throttling components, a fast-acting coil actuator, low hysteresis movement, and an energy-dense magnetic geometry. The flow modulation valve may be utilized for applications requiring readily amenable retrofitting, small diameter working fluid lines, high operational frequency, strict controllability, and low production and maintenance cost, among other requirements. As an example, the flow modulation valve is specifically suited for active combustion control systems applied to gas turbine operations, where the necessary stoichiometric flame control requires a number of compact, rapidly responding throttling devices, each acting on a fuel supply line to an individual turbine fuel injector. The high operational frequency, strict controllability, harsh operating conditions, and small diameter demands of this application tend to eliminate most known throttle valve and actuator combinations.

The flow modulation valve utilizes an arrangement where a sliding valve stem surrounds a hollow stem support and flow is directed through the stem support before passing between the valve face and the valve seat. This provides a flowpath where radial forces on the valve stem arising from fluid pressure are balanced and increased sliding friction between the valve stem and the stem support is avoided. Additionally, the flow arrangement avoids impinging flows on the valve face, reducing the force requirements for rapid actuation of the valve stem.

The valve stem is slidably transposed for high frequency flow modulation using a moving coil actuator to minimize response time. The permanent magnet and moving coil arrangement disclosed allows maximizing magnetic flux in the magnetic circuit air gap for a given overall size of the flow modulation valve. This allows maximization of the force translated to the moving valve stem and optimization of high frequency modulation when existing space constraints dictate a maximum overall size of the valve.

One specific embodiment of the present invention is intended for service in high temperature and high pressure applications, such as variable throttling of flow distribution on multiple burners to control combustion instability in low-emission gas turbines. In this application, the flow modulation valve is designed for operation at temperatures up to and pressures up to 450 psig. Further, the specific embodiment desirably possesses relatively small physical size for ease of retrofitting, and provides relatively simple access for ease of maintenance in the service environment. The specific embodiment described is contained within an outer casing having a diameter of about 2 inches, and an axial length of about 6.3 inches. The compact nature of this embodiment combined with the high forces afforded by the actuator design provide a flow modulation valve which is highly responsive to high-rate input control signals.

The various features of novelty which characterize this disclosure are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the disclosure is illustrated.

DETAILED DESCRIPTION OF THE PREFERRED EMBODIMENTS

Figure 1:
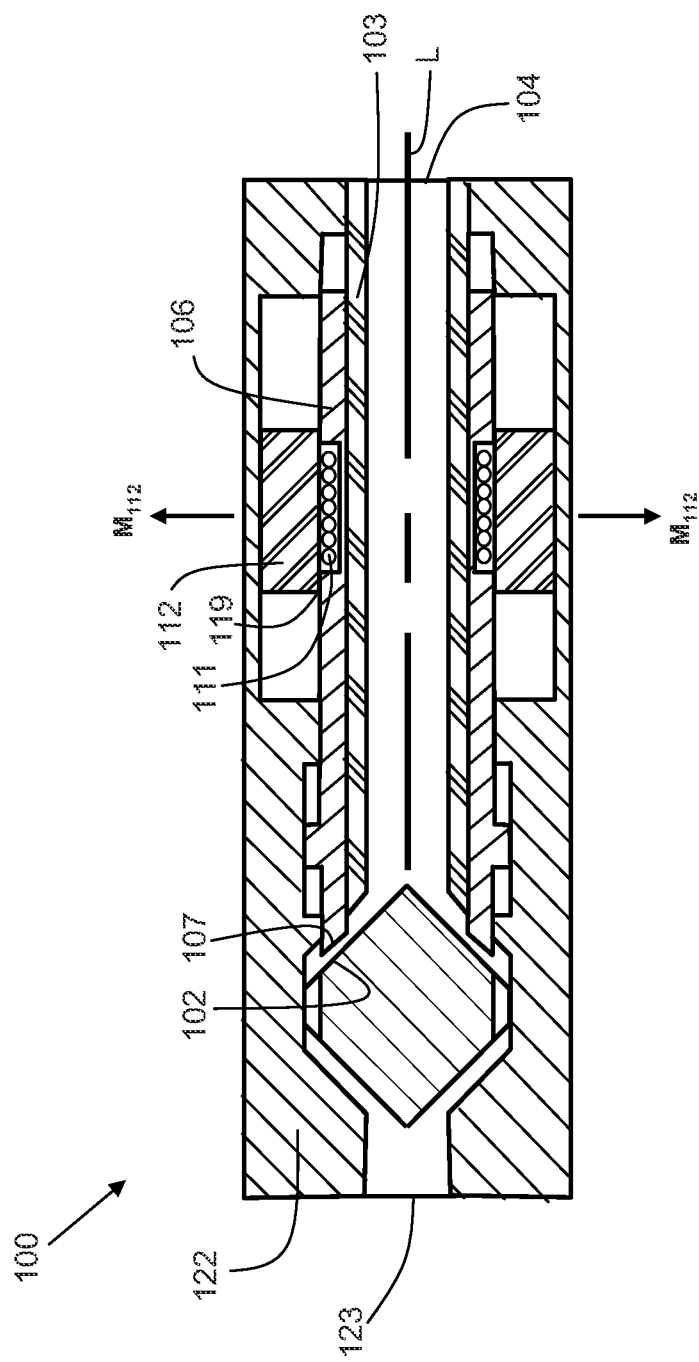
FIG. 1 shows a schematic longitudinal section of a flow modulation valve in accordance with a non-limiting embodiment of the present invention.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a flow modulation valve capable of high speed operation in high temperature, high pressure environments.

The present invention provides a flow modulation valve having attributes designed for rapid response to high frequency input drive signals. The assembly incorporates pressure balanced throttling components, a fast-acting coil actuator, low hysteresis movement, and an energy-dense magnetic geometry. The flow modulation valve may be utilized for applications requiring readily amenable retrofitting, small diameter working fluid lines, high nominal flow rates, high operational frequency, strict controllability, and low production and maintenance cost, among other requirements.

The flow modulation valve is specifically suited for active combustion control systems applied to gas turbine operations, where the necessary stoichiometric flame control requires a number of compact, rapidly responding flow modulating devices, each acting on a fuel supply line to individual turbine fuel injectors. The high operational frequency, strict controllability, harsh operating conditions, and small diameter demands of this application tend to eliminate most known throttle valve and actuator combinations. A particular embodiment of the flow modulation valve disclosed herein is particularly useful for direct fuel injection in close proximity to a combustion turbine. The flow modulation valve in this and other applications can provide fuel pulsation over a wide range of adjustable amplitude and effective frequency.

A flow modulation valve as disclosed herein may be utilized in applications where the flow modulation valve provides flow pulsation directly on a main fluid supply, thus eliminating the need for superimposing pulsed flows. In addition to improving flow modulation valve compactness, actuation of the flow pulsation directly on the main fluid supply allows sufficient pulsation with shorter valve strokes. In a particular embodiment, the shorter stroke for pulsation combined with interleaved permanent magnets maximizes the energy-density of the magnetic actuator and provides for faster response of moving parts and higher frequency modulation.

Response is further aided by the internal flowpath within the flow modulation valve. The flowpath within the flow modulation valve provides radially balanced flow forces on the valve stem and the valve face, greatly reducing any propensity for binding or other degrading impacts in the close tolerance, flow modulating valve. In a particular embodiment, reduced sliding friction further aids response.

The analog nature of the flow modulation valve allows continuous control over both the amplitude and frequency of the flow pulsations as well as continuous control over the mean flow rate provided. This allows the flow modulation valve to shift operating points easily as a result of changes to either pulsation requirements or mean flow rate requirements, greatly simplifying control.

Further, a particular embodiment of the flow modulation valve disclosed herein provides greatly reduced sensitivity to thermal cycling and high temperature environments as a result of holistic considerations concerning valve geometry, material characteristics, and actuator response. The holistic considerations have particular import in the modulation of direct fuel injection in close proximity to a combustion turbine, as might be desired in order to eliminate downstream fuel system impacts on the modulation schedule. Such proximity levies significant requirements in terms of high temperature behavior and space constraints, among other considerations.

General discussion of the flow modulation valve operation is discussed with reference to FIG. 1 which shows a schematic longitudinal section of an embodiment demonstrating the component parts of a flow modulation valve 100. Flow modulation valve 100 defines a general flowpath where flow enters through flow inlet 104, passes between valve face 107 and valve seat 102, and exits through flow outlet 123.

Stem support 103 is a hollow member having a longitudinal axis L, where a first end of stem support 103 comprises flow inlet 104. In the particular embodiment illustrated in FIG. 1, stem support 103 is an annular shaped member. Stem support 103 provides an enclosed flowpath extending from the first end at flow inlet 104 and proceeding through the hollow interior. For reasons to be explained subsequent, stem support 103 is fabricated at least in part from a ferromagnetic material comprising a stem support ferromagnetic section. Although the flow through the hollow interior is described generally in a particular direction herein, it is to be appreciated that flow could instead be run in the opposite direction.

Valve stem 106 is slidably disposed on and surrounding stem support 103. Valve stem 106 has a sliding range of motion along the longitudinal axis L of stem support 103 sufficient to establish contact between the valve face 107 and the valve seat 102.

Valve stem 106 has one or more energizable coils wound around its exterior, which is shown in FIG. 1 as energizable coil 111. Energizable coil 111 is fixably attached to, and surrounds, valve stem 106, such that a Lorentz force acting on energizable coil 111 is translated to substantially equivalent physical force on valve stem 106. Energizable coil 111 is wound such that, when in an energized state, current flows through energizable coil 111 in a direction normal to the longitudinal axis L of stem support 103. In the specific embodiment represented by FIG. 1, valve stem 106 is annular and current flow through energizable coil 111 is substantially circular in a plane that intersects the longitudinal axis L at a normal.

Permanent magnet 112 provides magnetic flux to energizable coil 111 which is located in magnetic circuit air gap 119. In the specific embodiment shown in FIG. 1, permanent magnet 112 is an annular magnet with radial polarity, such that the magnetic moment $M_{112}$ of permanent magnet 112 is oriented substantially at a normal to the direction of current flow when energizable coil 111 is energized. The magnetic flux produced by permanent magnet 112 acts on energizable coil 111 in a substantially normal manner over a longitudinal distance not less than the valve stroke, where the valve stroke is the translational displacement of valve stem 106 parallel to the longitudinal axis L sufficient to produce the maximum amplitude of flow modulation desired. $M_{112}$ may be oriented radially outward as in FIG. 1 or radially inward, as long as the magnetic moment $M_{112}$ is oriented substantially at a normal to the direction of current flow through energizable coil 111.

Valve body 122 contains flow outlet 123 allowing flow through the flow modulation valve 100. Valve body 122 also supports stem support 103 and valve seat 102. Additionally, valve body 122 is at least partially fabricated from a ferromagnetic material comprising a valve body ferromagnetic section. The valve body ferromagnetic section supports permanent magnet 112 and forms an integral part of the magnetic circuit that produces an energy-dense magnetic flux region in magnetic circuit air gap 119 between permanent magnet 112 and stem support 103.

As stated, the flow inlet 104 is located to provide a flowpath through stem support 103. Additionally, when valve stem 106 is slidably disposed toward flow outlet 123 such that valve stem 106 overhangs stem support 103 to some degree, as illustrated at FIG. 1, the flowpath further proceeds through the overhanging portion of valve stem 106 so that radial forces generated by the flowpath pressure act uniformly on the overhanging portion of valve stem 106, greatly minimizing any propensity for hydraulic imbalance as a result of the flow. Further, this flowpath geometry acts to avoid impinging flows on valve stem 106 during operation.

In operation, permanent magnet 112 drives magnetic flux through magnetic circuit air gap 119 between permanent magnet 112 and stem support 103 at a direction substantially normal to energizable coil 111. The valve body ferromagnetic section and the stem support ferromagnetic section act as components in the magnetic circuit which includes permanent magnet 112 and magnetic circuit air gap 119, and which passes through energizable coil 111. The magnetic flux through the magnetic circuit air gap 119 is maximized by permanent magnet 112 by ensuring that the stem support ferromagnetic section and the valve body ferromagnetic section have sufficient thickness to avoid being driven into saturation. Magnetic saturation of the stem support ferromagnetic section or the valve body ferromagnetic section increases flux leakage outside the magnetic circuit, decreases the magnetic flux in the magnetic circuit air gap 119 between permanent magnet 112 and stem support 103, and reduces the force which may be produced on energizable coil 111 for a given magnitude of current.

When energizable coil 111 is energized such that current flows in a direction acting to generate a Lorentz force parallel to longitudinal axis L and toward the flow inlet 104, the valve stem 106 correspondingly slides on the stem support 103 toward the flow inlet 104 and increases the longitudinal displacement between valve face 107 and valve seat 102, further opening the flow modulation valve and allowing for increased flow rate. In a similar fashion, when energizable coil 111 is energized such that current flows in a direction acting to generate a Lorentz force parallel to longitudinal axis L and toward the flow outlet 123, the Lorentz force acts to slidably translate the valve stem 106 toward the flow outlet 123, decreasing the longitudinal displacement between valve face 107 and valve seat 102 and further closing the flow modulation valve, thus decreasing the flow rate. A high frequency control signal which modulates between current flow in the opening direction and current flow in the closing direction causes rapid actuation of the valve stem 106 in the opening and closing directions, and produces a high frequency pulsation on the mass flow stream through the throttle valve assembly. Thus, the flow modulation valve provides flow pulsation directly on a main fluid supply, eliminating the need for superimposing pulsed flows. In addition to improving flow modulation valve compactness, actuation of the flow pulsation directly on the main fluid supply allows sufficient pulsation with shorter valve strokes.

Figure 5:
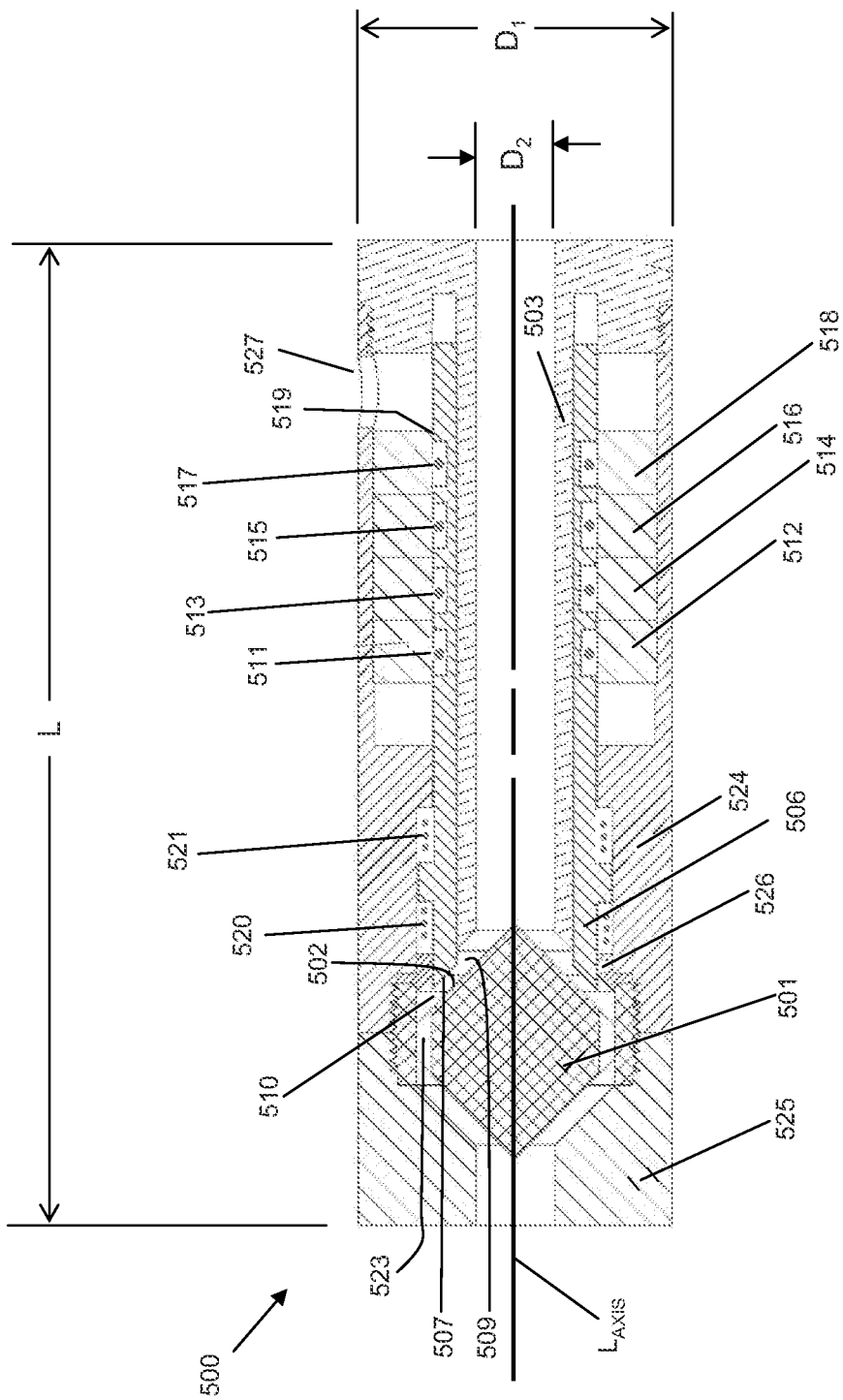
FIG. 5 shows a schematic longitudinal section of a flow modulation valve in accordance with a non-limiting embodiment of the invention intended for operation in a high temperature, high pressure environment.

In another embodiment, a first spring means may act between valve body 122 and valve stem 106 to provide an opening bias on valve stem 106 that tends to move valve face 107 away from valve seat 102. Similarly, a second spring means may act between valve body 122 and valve stem 106 to provide a closing bias on valve stem 106 that tends to move valve face 107 toward valve seat 102. In the absence of Lorentz forces acting on valve stem 106, the first spring means and second spring means can act to hold valve stem 106 in a fixed, intermediate position, providing a fixed area between valve face 107 and valve seat 102 for fluid flow. Operationally, this allows the flow modulation valve 100 to assume a predetermined position when the energizable coil 111 is in a de-energized state. This also allows control of the mean displacement between valve face 107 and valve seat 102 about which the valve stem 106 slidably modulates, by controlling the mean signal about which the high frequency control signal modulates. The first spring means and the second spring means may be a mechanical or a magnetic spring. As an example of a first spring means and a second spring means providing this type of operation, FIG. 5 illustrates a particular embodiment where first spring means 520 and second spring means 521 act between a valve body component 526 and valve stem 506 to provide opening and closing biases respectively on valve stem 506.

Figure 6A:
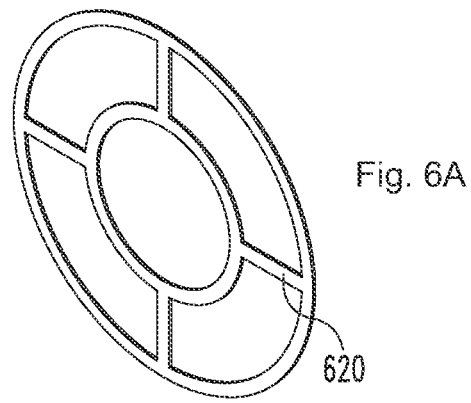
FIG. 6A shows an isometric view of a flat spring mechanism in accordance with a non-limiting embodiment of the invention.
Figure 6B:
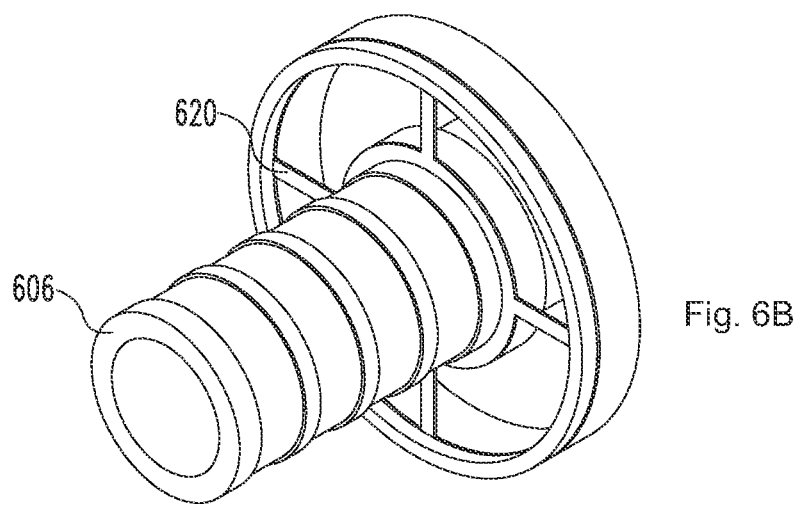
FIG. 6B shows an isometric view of the flat spring mechanism of FIG. 6A disposed on a valve stem in accordance with a non-limiting embodiment of the invention.

In yet another embodiment, a single spring means, e.g., without limitation, a spring means formed from a thin sheet such as spring means 620 of FIG. 6A, is employed in lieu of opposing spring means to provide a restoring stiffness. FIG. 6B shows how spring means 620 is installed on an example valve stem 606. Such single spring means tends to reduce the sliding friction between the stem support 103 (or 503) and valve stem 106 (or 506).

The flow modulation valve 100 therefore functions with a moving coil design as the force driver. The moving coil approach to converting current to force minimizes the inductance-resistance (L-R) time constant associated with electromagnetic drivers. A moving coil driver potentially allows a very fast acting control valve since the delay between application of a voltage to the coil and the development of the driving force is minimized. The moving coil design also allows driving in both directions by reversing the current. It is further understood, with reference to FIG. 1, that because the magnitude of the Lorentz force is determined by the magnitude of the current flowing through energizable coil 111, while the magnitude of the spring forces is determined based on valve stem 106 displacement, a consistent relationship between the magnitude of current flowing through energizable coil 111 and the relative positions of valve face 107 and valve seat 102 result. Thus, the magnitude of current flowing through energizable coil 111 may be controlled to provide a specific flow area between valve face 107 and valve seat 102.

Additionally, the internal flowpath through flow modulation valve 100 allows delivery of main fluid flow through stem support 103 and the overhanging section of valve stem 106 in an arrangement whereby the radial forces generated by the main fluid flow are balanced around the periphery of the overhanging section of valve stem 106. This significantly reduces the likelihood of hydraulic imbalance on valve stem 106 arising from a large mass flow rate through the flow modulation valve 100, and increases the sensitivity of the flow modulation valve 100 to control signals requesting flow pulses which may be small in magnitude compared to the average mass flow rate delivered.

Figure 2:
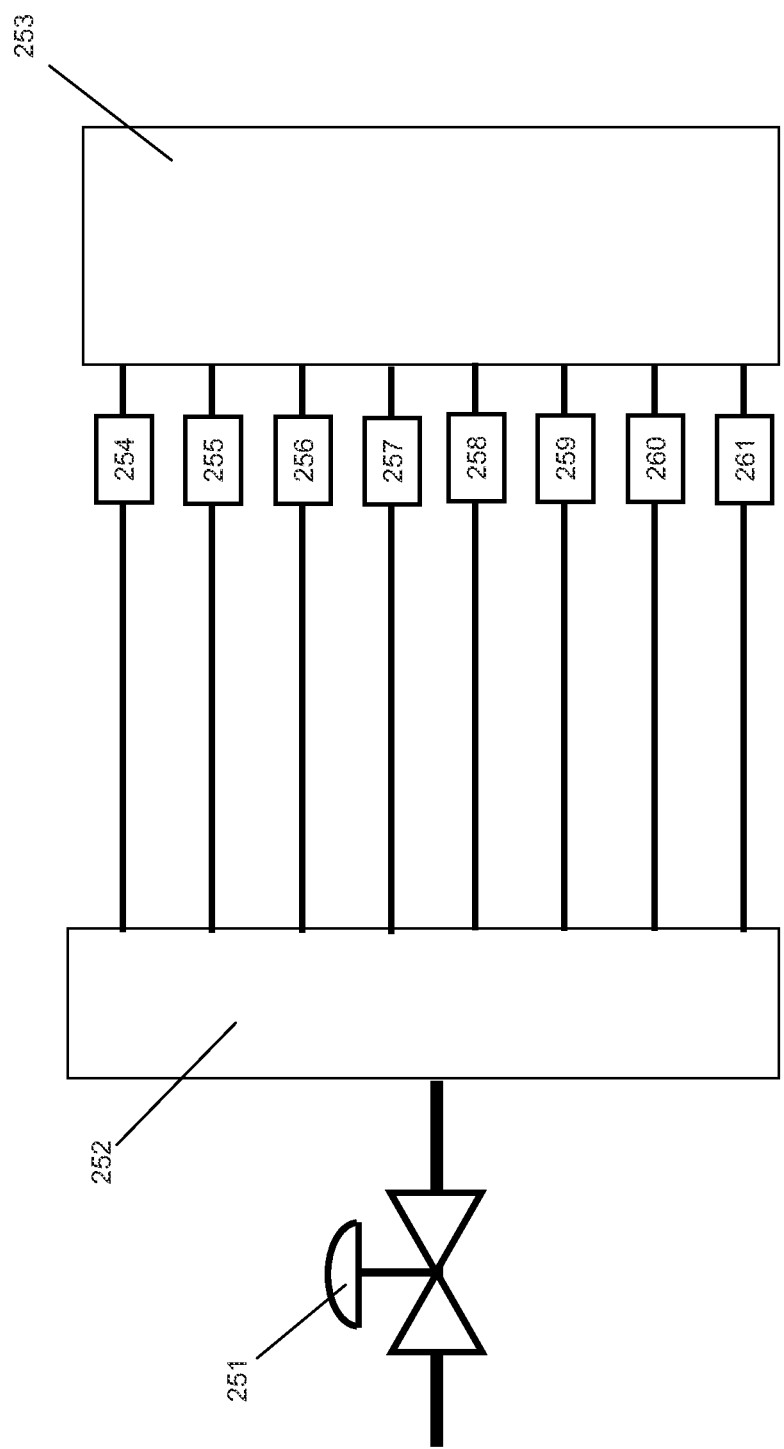
FIG. 2 shows a representative application of the flow modulation valve in a metered flow system.

A particular application of flow modulation valve 100 is discussed with reference to FIG. 2 which illustrates a fuel system providing fuel through a throttle valve 251 to a fuel manifold 252. Fuel manifold 252 directs fuel flow through individual fuel lines to individual fuel injectors in combustion turbine 253. Flow modulation valves 254 through 261 provide flow modulation of the main fuel flow to each fuel injector through each individual fuel line. In the application depicted, throttle valve 251 provides metered flow based on, for example, a speed control loop, and each flow modulation valve 254 through 261 passes the mass flow rate of fuel distributed by fuel manifold 252 to an individual fuel line serving an individual fuel injector. Fuel modulation to individual fuel lines is generated by a modulating control signal driving the individual flow modulation valve. The modulating control signal could be based on feedback from engine sensors providing an indication of the magnitude and frequency of pressure oscillations in the turbine engine, and the resulting fuel modulation from the flow modulation valve would be intended to suppress the pressure oscillations. Because the flow modulation valve is capable of providing modulation directly to a main fluid flow, response to changes in the control signal is rapid and consistent, and the analog nature of the flow modulation valves allows adjustment based on both amplitude and frequency changes to the modulating control signal. Additionally, and significantly, while an individual flow modulation valve is required to pass the full mass flow rate of an individual fuel line, the gross throttling that drives the metered flow rate is provided by throttle valve 251. Thus, flow modulation valves 254-261, responsible only for fuel flow modulation, may operate with very short strokes. Further, the geometry of the flow modulation valve provides a compact, in-line configuration capable of operation within small space constraints as might exist between individual fuel lines. Through proper material selection, the compact, in-line geometry also lends itself to operation in the high temperature environments that prevail in close proximity to combustion turbines. These close proximity placements eliminate many of the resonant responses and time delays arising from fuel system components between flow modulating devices and fuel injectors, and simplifies fuel flow modulation control.

Figure 3:
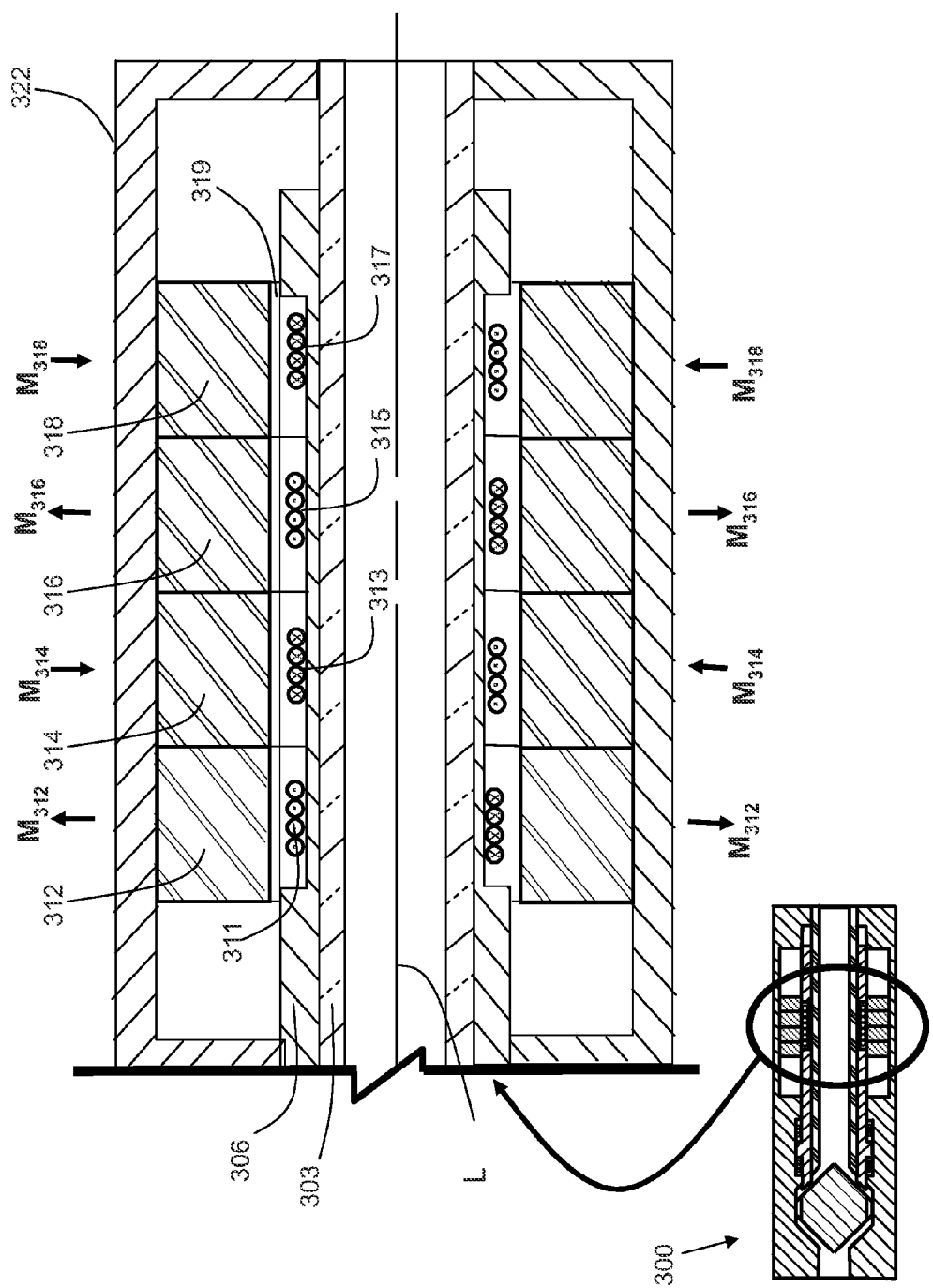
FIG. 3. shows a portion of a schematic longitudinal section of a flow modulation valve utilizing four permanent magnets and four energizable coils in accordance with a non-limiting embodiment of the present invention, demonstrating the relationship between the magnetic moments of the permanent magnets and the direction of current flow in the energizable coils.

In another embodiment, the Lorentz force acting on the slidable valve stem is increased by utilizing a plurality of permanent magnets and a plurality of energizable coils. Such an arrangement is shown at FIG. 3, illustrating a longitudinal cross-section view of the magnetic actuator employed by flow modulation valve 300 utilizing four energizable coils and four permanent magnets. The four energizable coils 311, 313, 315, and 317 are wound around and fixably attached to valve stem 306 such that current flows through the energizable coils substantially normal to the longitudinal axis L. Individual coils are wound oppositely with respect to an immediately neighboring coil. This is indicated in FIG. 3 using nomenclature where a dot indicates current flow out of the page and an x indicates current flow into the page. Similarly, the four permanent magnets 312, 314, 316, and 318 have radial polarity and are arranged such that the magnetic moment of an individual permanent magnet is oriented substantially parallel to and opposite from an immediately neighboring permanent magnet. As illustrated at FIG. 3, permanent magnet 312 acts primarily on energizable coil 311, permanent magnet 314 acts primarily on energizable coil 313, permanent magnet 316 acts primarily on energizable coil 315, and permanent magnet 318 acts primarily on energizable coil 317, such that the magnetic moments pass through the energizable coils substantially at a normal. The magnetic moments of the permanent magnets and the respective coils are oriented with respect to each other so that current flow through the energizable coils results in Lorentz forces on the energizable coils acting substantially parallel to the longitudinal axis L and in the same direction. The width of each permanent magnet and the displacement between immediately adjacent energizable coils is such that the Lorentz force generated on an individual energizable coil has consistent direction over a longitudinal length at least as great as the valve stroke.

The permanent magnets 312, 314, 316, and 318 are supported by the valve body ferromagnetic section comprising valve body 322. The valve body ferromagnetic section thereby functions as an outer flux keeper to channel magnetic flux between immediately adjacent permanent magnets. It can be appreciated that interleaving the permanent magnets in the manner described, so that an individual permanent magnet exhibits a magnetic moment substantially parallel to and opposite from an immediately neighboring permanent magnet, minimizes the thickness of the valve body ferromagnetic section required in order to avoid saturation. Thus, for a given thickness of the valve body ferromagnetic section, interleaving the permanent magnets in the manner described maximizes the magnetic flux passing through the magnetic circuit air gap 319 between the permanent magnets and the stem support 303 and passing through the energizable coils 311, 313, 315, and 317 located in the magnetic circuit air gap 319, thereby maximizing the Lorentz forces which can be produced and act on the slidable valve stem 306. Maximizing the Lorentz forces for a given valve body ferromagnetic section thickness directly impacts the time response of the flow modulation valve, and provides significant advantage when the valve body ferromagnetic section thickness is constrained to a certain value due to, e.g., required overall valve size. Similarly, the stem support ferromagnetic section comprising stem support 303 functions as an inner flux keeper and also benefits from a reduced required thickness. This adds additional benefit in that the flow area through stem support 303 can then be maximized.

The flow modulation valve 300 may have any number of permanent magnets and energizable coils, provided that the magnetic moment of an individual permanent magnet is oriented substantially parallel to and opposite from an immediately neighboring magnet, and provided that energizable coils are wound such that current flow through an individual energizable coil is parallel to and opposite from an immediately neighboring energizable coil, and the relationship between the magnetic moments and the current flow produces a Lorentz force on each energizable coil acting on the valve stem 306 in the same longitudinal direction. For a flow modulation valve 300 limited by overall size constraints, or where the valve body 322 and the stem support 303 have minimum acceptable thicknesses due to, e.g., fluid flow pressure in the anticipated operating environment, this arrangement provides a manner in which the magnetic flux delivered across magnetic circuit air gap 319 may be maximized while avoiding saturation of the valve body ferromagnetic section and the stem support ferromagnetic section. Appropriate dimensions and materials for the ferromagnetic sections such that saturation is avoided for a given permanent magnet combination may be determined with electromagnetic field simulation software, such as that provided by ANSOFT MAXWELL. With this alternating magnet arrangement, the maximum force acting on the valve stem 306 can be increased by simply adding magnet/coil pairs, as needed, without creating magnetic flux saturation problems.

Note also that while providing a quantity of energizable coils equal to the quantity of permanent magnets utilized may maximize the total Lorentz forces felt on the valve stem 306, this is not strictly necessary in order to use the discussed principle for maximizing air gap magnetic flux under existing valve geometry design constraints.

Figure 4:
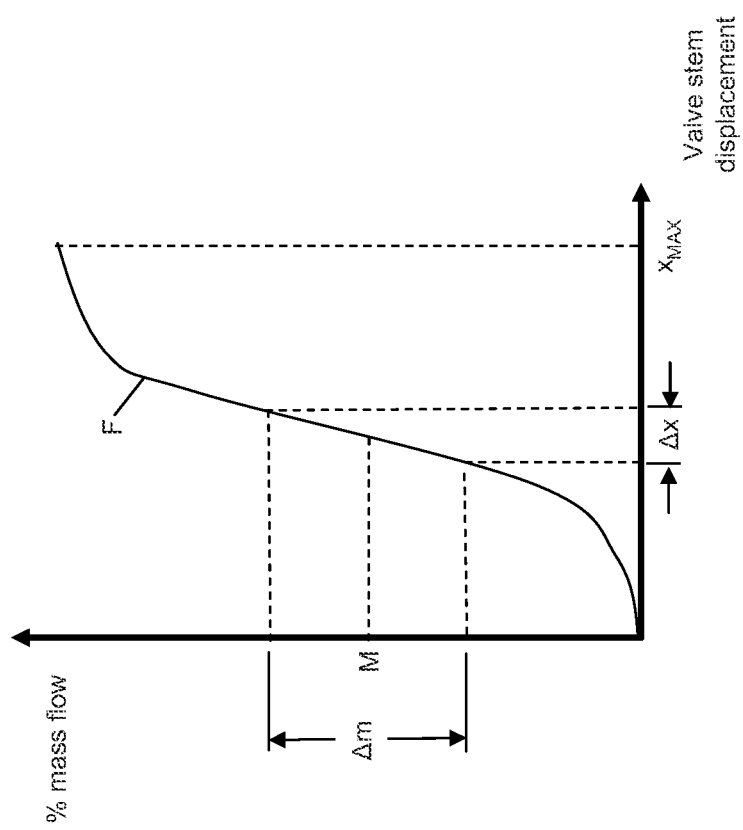
FIG. 4 shows the relationship between valve stem displacement and required flow modulation for a representative flow characteristic.

It can be readily appreciated that when utilizing multiple permanent magnets and multiple energizable coils in the manner discussed, there is a required relationship between the longitudinal distance over which an individual permanent magnet may interact with an individual energizable coil and the valve stroke required for variance of the flow area between the valve face and the valve seat, based on the modulation required. As previously discussed, the flow area available between these components is determined by the movement of valve stem 106. As an illustration of how this flow area might vary, the flow characteristic F in FIG. 4 represents a mass flow versus valve stem displacement characteristic of the flow area between valve face 107 and valve seat 102 that might result over a maximum effective valve travel $X_{MAX}$ of valve stem 106. The maximum effective valve travel $X_{MAX}$ of FIG. 4 means the longitudinal distance between the valve stem 106 slid fully forward, where the valve face 107 contacts the valve seat 102, and the valve stem 106 slid fully backward, toward the flow inlet, until further valve stem 106 motion ceases to impact flow rate through the flow modulation valve. In the particular embodiment of FIG. 1, the valve stem 106 would cease to impact flow rate through the flow modulation valve when the longitudinal distance from valve face 107 to the flow inlet 104 is less than the longitudinal length of stem support 103.

Referring to FIG. 4, a mean mass flow rate M flows through the flow modulation valve. The flow modulation valve is required to pass the full mean mass flow rate M, however the magnitude of the mean mass flow rate M is largely determined by an external component, such as throttle valve 251 at FIG. 2, rather than the flow modulation valve itself. In this type of arrangement, the flow modulation valve is only required to produce a flow modulation over the mass flow range Δm. As indicated at FIG. 4, the valve stroke Δx required to vary the flow area between the valve face and the valve seat and provide modulation over the mass flow range Δm is significantly less than the maximum effective valve travel $X_{MAX}$. Thus, an individual permanent magnet is only required to interact with an individual energizable coil for generation of Lorentz force over the longitudinal distance of the valve stroke Δx. This operation allows providing multiple permanent magnets and energizable coils for Lorentz force production on the valve stem, provided that the width of an individual magnet is sufficient to interact with an individual energizable coil over a longitudinal distance of at least the valve stroke Δx. In this manner, the magnetic flux in the magnetic actuator may be optimized for a given flow modulation requirement, and the compact arrangement can provide a high force actuator capable of high frequency modulation over a relatively short valve stroke.

It is understood that linearity of the flow characteristic F over the range Δx will offer simplifications to the required modulation control signal. It is further understood that operation of the flow modulation valve is not specifically restricted to flow arrangements whereby an external component largely dictates the mass flow rate M, or arrangements where the valve stroke Δx is less than the maximum effective valve travel $X_{MAX}$. The discussion with reference to FIG. 4 is merely intended as an indication of a possible application of the flow modulation valve and the manner in which direct modulation on a main fluid supply may produce short stroke requirements, allowing optimization of magnetic actuator force within existing space constraints.

In the embodiment illustrated in FIGS. 1 and 3, the stem support is a hollow annulus providing a flowpath therethrough. The valve stem similarly is shown as a hollow annulus surrounding and slidably disposed on the stem support, and the permanent magnets employed are radial polarity annular magnets providing magnetic flux to the energizable coils. This specific geometry is not required, but rather is offered as one embodiment practicing the disclosure herein. Those skilled in the art will readily recognize that variations in valve geometry and specific flowpath may exist without violating the spirit of the disclosure.

FIG. 5 illustrates an embodiment of a flow modulation valve 500 designed for service in high temperature and high pressure applications, such as variable throttling of flow distribution on multiple burners to control combustion instability in low-emission gas turbines. In this application, the flow modulation valve must be capable of operation at temperatures up to 650° F. and pressures up to 450 psig. Further, the flow modulation valve desirably possesses relatively small physical size for ease of retrofitting, and provides relatively simple access for ease of maintenance in the service environment. The compactness available in the novel flow modulation valve presented herein is aptly demonstrated in the particular embodiment shown in FIG. 5, where diameter $D_1$ is designed at about 2 inches, diameter $D_2$ is designed at about 0.5 inches, and axial length $L_1$ is designed at about 6.3 inches. The compact and robust nature of this particular embodiment allows employment at space constrained locations in close proximity to operating gas turbines and thus offers further simplification of necessary control signals. Close proximity to the operating turbine provides a significant reduction in the downstream fuel system and removes the attendant resonant response and time delay concerns associated with downstream components in fuel flow modulation applications.

The embodiment illustrated in FIG. 5 has longitudinal axis $L_{AXIS}$, as shown. The valve body comprising flow modulation valve 500 is comprised of a flow outlet casing 525, a middle casing 524, and a valve plug 501. Valve seat 502 is contained on the valve plug 501. The valve plug 501 is threadably engaged to and supported by flow outlet casing 525 and the middle casing 524, and the stem support 503 is threadably engaged to and supported by middle casing 524. Although threadably engaged in the illustrated embodiment, it is to be appreciated that such elements may be held together by other suitable mechanisms or arrangements of mechanisms. Valve stem 506 surrounds and is slidably supported on an annular support section of stem support 503, such that the longitudinal axis of valve stem 506 and the longitudinal axis of stem support 503 is coincident with $L_{AXIS}$. Because of the annular shape of valve stem 506 and stem support 503, high pressure flow through stem support 503 and any overhanging portion of valve stem 506 exerts substantially zero net radial static pressure force around the inner periphery of valve stem 506. Additionally, valve plug 501 is symmetric about a rotational axis coincident with $L_{AXIS}$, and presents a right circular cone to the incoming high pressure flow, such that any backpressure felt by the high pressure flow as a result of encountering valve plug 501 and valve seat 502 acts equally around the periphery of valve face 507. Similarly, a flow passage 523 is comprised of a plurality of holes having equal radius and being machined through valve plug 501 on a circle of centers around the apex of the right circular coned face of valve plug 501, producing backpressure symmetry with respect to the valve stem 506 and the valve face 507. These symmetries minimize any hydraulic imbalance generated on valve stem 506 as a result of high pressure flow through the flow modulation valve, and minimize mechanical hysteresis and sliding friction between the valve stem 506 and the stem support 503.

Longitudinal forces in a direction parallel to $L_{AXIS}$ are generated on valve stem 506 by the production of Lorentz forces on four energizable coils 511, 513, 515, and 517. The four energizable coils 511, 513, 515, and 517 are fixably attached to and wound around valve stem 506 in opposite directions, but electrically in series to allow using a single set of electrical leads. The series electrical arrangement is exemplary only, and alternate wiring of energizable coils is within the bounds of this disclosure. For example, energizable coils 511, 513, 515, and 517 could be wired to operate in an electrically parallel manner so that voltage may be applied independently across each coil, allowing the current to the coils to be maximized and maximizing the generated Lorentz forces on the coils.

Four annular permanent magnets 512, 514, 516 and 518 provide magnetic flux to influence energizable coils 511, 513, 515, and 517 and have a longitudinal axis coincident with $L_{AXIS}$. In the specific embodiment of FIG. 5, intended for a high temperature application, the permanent magnet material to be utilized presents special considerations. Any permanent magnet material utilized must possess a Curie Temperature higher than the temperature of the application envisioned. For an application at 650° F., as envisioned by the specific embodiment of FIG. 5, Samarium Cobalt ($Sm_2Co_{17}$) is utilized as the permanent magnet material. $Sm_2Co_{17}$ possesses a Curie Temperature exceeding 650° F., and also possesses high energy for the volume of material used, with a maximum energy product of about 30 megagauss oersteds. In the specific embodiment of FIG. 5, each annular $Sm_2Co_{17}$ magnet has a major diameter of about 1.8 inches, a minor diameter of about 1.05 inches, and an axial length of about 0.4 inches. Such annular $Sm_2Co_{17}$ magnets having radial polarity as required in the specific embodiment of FIG. 5 are commercially produced and available. Such magnets may be formed in arc segments, with one annulus being formed from a number of segments (typically 8-12 segments). As previously discussed, the use of multiple permanent magnets in an interleaved manner maximizes the magnetic flux across the magnetic circuit air gap 519, maximizing the force of the actuator on the valve stem while allowing the keepers of the magnetic circuit to be as thin as possible without becoming magnetically saturated, given the diameter constraints $D_1$ and $D_2$ within which the flow modulation valve is designed to operate.

In the particular embodiment of FIG. 5, the choice of $Sm_2Co_{17}$ for the permanent magnet material also has impact on further material selection over the remainder of the flow modulation valve. $Sm_2Co_{17}$, is relatively brittle and susceptible to chipping and cracking. In a high temperature application, this introduces concerns regarding thermal expansion of the surrounding components. It is desired that the material utilized for the fabrication of the surrounding components experience thermal expansion similar to that of the annular $Sm_2Co_{17}$ permanent magnets 512, 514, 516 and 518, so that dimensional changes during high temperature application do not introduce additional stresses on the brittle $Sm_2Co_{17}$ material. In a specific embodiment such as that illustrated by FIG. 5, where the annular permanent magnets 512, 514, 516 and 518 and the majority of components depicted have symmetry about $L_{AXIS}$, this can be accomplished by selecting materials having a similar coefficient of thermal expansion to $Sm_2Co_{17}$. For example, the specific embodiment of FIG. 5 utilizes AISI 1018 steel material for the stem support 503, the middle casing 524, the flow outlet casing 525, and the valve plug 501, and Glass-Mica ceramic for the valve stem 506. These exemplary materials possess a coefficient of thermal expansion within 0.12% of $Sm_2Co_{17}$. Additionally, the Glass-Mica ceramic has the added advantage of presenting a low friction slidable surface, further assisting the rapid action required of valve stem 506 during operation. Other materials may be selected provided the thermal characteristics of the flow modulation valve configuration provide sufficient dimensional behavior to avoid generation of additional stresses on the brittle $Sm_2Co_{17}$ material at the operating temperature. The sufficiency of given materials in given configurations that comprise a flow modulation valve operating at specified temperature and pressure may be evaluated using well-known finite element analysis software, such as ANSYS.

As will be understood, the exemplary materials outlined above constitute the materials used for a single embodiment. The disclosure herein is not limited by material selection. Many considerations imposed by, for example, anticipated operating temperature and pressure requirements, will impose constraints which must be satisfied by the material selected. Similarly, exemplary dimensions are not intended to limit this disclosure.

Additionally, the embodiment of FIG. 5 includes a retaining ring 526, held in place as an insert between valve plug 501 and middle casing 524. Retaining ring 526 provides support for first spring means 520. This threaded arrangement provides for ease of access and assembly. Once assembled, access port 527 provides access into the flow modulation valve to supply electric power to energizable coils 511, 513, 515, and 517. Access port 527 utilizes a pressure-holding feed-through connection rated for the intended operating pressure of the flow modulation valve. This acts as the pressure barrier between the fluid being throttled and the ambient environment, since the necessary dimensional clearance between middle casing 524 and valve stem 506, which permits sliding translation of valve stem 506, acts to pressurize the interior of flow modulation valve 500 up to the pressure-holding feed-through connection.

In another embodiment, the exterior of the flow modulation valve is sheathed in a material which may have a composition different from components comprising the flow modulation valve. This may be necessary if, for example, the valve body material is not sufficiently rated for prevailing operating conditions. In such a case, an outer sheathing (which functions as a pressure vessel) may be placed around the flow modulation valve to permit operation in the prevailing conditions.

The flow modulation valve as provided herein incorporates pressure balanced throttling components, a fast-acting coil actuator, low hysteresis movement, and an energy-dense magnetic geometry, in order to produce throttling action in response to input drive signals at a high rate of responsiveness. The flow modulation valve may be utilized for applications requiring readily amenable retrofitting, small diameter working fluid lines, high operational frequency, strict controllability, and low production and maintenance cost, among other advantages. The flow modulation valve utilizes Lorentz forces acting against mechanical spring means to provide a variable flow area, allowing strictly controlled and consistent throttling action in response to input control signals. The flow modulation valve is particularly suited to applications requiring rapid response throttling devices, such as active combustion control systems applied to gas turbine operations where fuel flow modulation at extremely high frequencies is required in response to detected combustion instabilities.

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of elements or sequences, or the use of numbers, letters, or other designations therefore, is not intended to limit the claimed processes to any order except as may be specified in the claims. Accordingly, the invention is limited only by the following claims and equivalents thereto.

All publications and patent documents cited in this application are incorporated by reference in their entirety for purposes to the same extent as if each individual publication or patent document were so individually denoted.

What is claimed is:

1. A flow modulation valve having a valve stroke comprising:
   a stem support, the stem support comprised of a stem support ferromagnetic section and having a longitudinal axis, the stem support having a hollow cross-section normal to the longitudinal axis and having a first end and a second end, wherein the second end is displaced from the first end by the longitudinal dimension of the stem support, and wherein the first end comprises a flow inlet;
   a valve seat positioned proximate to the second end of the stem support;
   a valve stem slidably disposed on and radially surrounding the stem support, the valve stem having a hollow cross-section normal to the longitudinal axis and the valve stem having a sliding range of motion along or parallel to the longitudinal axis at least equal to the valve stroke and sufficient to establish contact between a valve face at one end of the valve stem and the valve seat;
   one or more energizable coils wound around the valve stem and fixably attached to the valve stem at the stem support ferromagnetic section, the one or more energizable coils wound such that a path of current flow through the one or more energizable coils exists in a substantially normal direction to the longitudinal axis of the stem support, wherein an individual coil within the one or more energizable coils is located longitudinally on the valve stem such that the individual coil is longitudinally displaced from an immediately neighboring coil, if any, by a longitudinal distance no less than the valve stroke, and wherein the individual coil is wound oppositely from the immediately neighboring coil, if any;
   at least one permanent magnet arranged such that the magnetic moment of an individual permanent magnet in the at least one permanent magnet is parallel to but reversed from an immediately neighboring permanent magnet, if any, wherein the individual permanent magnet is positioned such that a vector extending from the individual permanent magnet and parallel to and having the same direction as the magnetic moment of the individual permanent magnet intersects the individual energizable coil at a direction normal to the direction of current flow over a translational distance of the valve stem at least equal to the valve stroke;

a magnetic circuit air gap between the at least one permanent magnet and the stem support ferromagnetic section, the magnetic circuit air gap containing the one or more energizable coils, such that a magnetic flux from the individual permanent magnet produces a Lorentz force on the individual energizable coil when a current flows through the individual energizable coil; and a valve body having a flow outlet and supporting the valve seat such that the valve seat lies longitudinally between the flow inlet and the flow outlet, the valve body further supporting the stem support, and the valve body having a valve body ferromagnetic section further supporting the at least one permanent magnet, the at least one permanent magnet supported by the valve body ferromagnetic section such that the at least one permanent magnet separates the valve body ferromagnetic section and the magnetic circuit air gap.

2. The flow modulation valve of claim 1 wherein the at least one permanent magnet surrounds the valve stem, and wherein the valve body ferromagnetic section surrounds the at least one permanent magnet.

3. The flow modulation valve of claim 2 wherein the magnetic circuit air gap provides a uniform separation between the at least one permanent magnet and the stem support ferromagnetic section and wherein the uniform separation is determined over a distance perpendicular to the longitudinal axis.

4. The flow modulation valve of claim 3 wherein the stem support cross-section normal to the longitudinal axis is substantially constant along the length of the longitudinal axis, wherein the valve stem cross-section normal to the longitudinal axis is substantially constant along the length of the longitudinal axis, and wherein the stem support cross-section normal to the longitudinal axis and the valve stem cross-section normal to the longitudinal axis are mathematically symmetric around the longitudinal axis with at least two lines of symmetry.

5. The flow modulation valve of claim 4 wherein the stem support cross-section normal to the longitudinal axis and the valve stem cross-section normal to the longitudinal axis are annular and wherein the at least one permanent magnet is an annular magnet having radial polarity.

6. The flow modulation valve of claim 4 wherein the valve seat has a valve seat cross-section normal to the longitudinal axis and the valve face has a valve face cross-section normal to the longitudinal axis and wherein the valve seat cross-section normal to the longitudinal axis is substantially equivalent to the valve face cross-section normal to the longitudinal axis.

7. The flow modulation valve of claim 6 wherein the valve body is comprised of a valve plug and wherein the valve seat is located on the valve plug.

8. The flow modulation valve of claim 7 wherein the valve plug is symmetric about a rotational plug axis coincident with the longitudinal axis and wherein the valve plug contains one or more flow passages through the valve plug and located between the valve seat and the outermost radius of the valve plug.

9. The flow modulation valve of claim 8 wherein the valve body is further comprised of a flow outlet casing comprised of the flow outlet and a middle casing, wherein the valve plug is threadably engaged to the flow outlet casing and the middle casing, and wherein the middle casing is threadably engaged to the stem support.

10. The flow modulation valve of claim 1 wherein the at least one permanent magnet is comprised of a samarium cobalt material.

11. The flow modulation valve of claim 1 wherein the valve body and the stem support are fabricated from a steel alloy, wherein the valve stem is fabricated from glass mica, and wherein the one or more energizable coils are fabricated using copper wire.

12. The flow modulation valve of claim 1 wherein the one or more energizable coils is a plurality of energizable coils and wherein the at least one permanent magnet is a plurality of permanent magnets and wherein the plurality of energizable coils equals the plurality of permanent magnets in number.

13. The flow modulation valve of claim 12 wherein a maximum effective valve travel of the flow modulation valve is greater than the valve stroke, wherein the valve body ferromagnetic section has a thickness in a dimension coincident with or parallel to a vector perpendicular to the longitudinal axis such that the plurality of permanent magnets does not drive the valve body ferromagnetic section into magnetic saturation, and wherein the stem support ferromagnetic section has a thickness in a dimension coincident with or parallel to a vector perpendicular to the longitudinal axis such that the plurality of permanent magnets does not drive the stem support ferromagnetic section into magnetic saturation.

14. The flow modulation valve of claim 1 wherein a spring mechanism supported by the valve body biases the valve stem at a predetermined position when the one or more energizable coils are de-energized.

15. The flow modulation valve of claim 14 wherein the spring mechanism comprises a single, generally flat, spring member.

16. The flow modulation valve of claim 14 wherein the spring mechanism comprises:
a first spring mechanism supported by the valve body biasing the valve stem in a first longitudinal direction; and
a second spring mechanism supported by the valve body biasing the valve stem in a second longitudinal direction opposite to the first longitudinal direction, such that the first spring mechanism and the second spring mechanism maintain the valve stem at a predetermined position when the one or more energizable coils are deenergized.

17. A flow modulation valve having a valve stroke comprising:
a stem support, the stem support comprised of a stem support ferromagnetic section and having a longitudinal axis, the stem support having an annular cross-section normal to the longitudinal axis and having a first end and a second end, wherein the second end is displaced from the first end by the longitudinal dimension of the stem support, and wherein the first end comprises a flow inlet;
a valve seat positioned proximate to the second end of the stem support;
a valve stem slidably disposed on and radially surrounding the stem support, the valve stem having an annular cross-section normal to the longitudinal axis and the valve stem having a sliding range of motion along or parallel to the longitudinal axis at least equal to the valve stroke and sufficient to establish contact between a valve face at one end of the valve stem and the valve seat;

one or more energizable coils wound around the valve stem and fixably attached to the valve stem, the one or more energizable coils wound such that a path of current flow through the one or more energizable coils exists in a substantially normal direction to the longitudinal axis of the stem support, wherein an individual coil within the one or more energizable coils is located longitudinally on the valve stem such that the individual coil is longitudinally displaced from an immediately neighboring coil, if any, by a longitudinal distance no less than the valve stroke, and wherein the individual coil is wound oppositely from the immediately neighboring coil, if any;

at least one permanent magnet having an annular cross-section and radial polarity, the at least one permanent magnet surrounding the valve stem and arranged such that the magnetic moment of an individual permanent magnet in the at least one permanent magnet is parallel to but reversed from an immediately neighboring permanent magnet, if any, wherein the individual permanent magnet is positioned such that a vector extending from the individual permanent magnet and parallel to and having the same direction as the magnetic moment of the individual permanent magnet intersects the individual energizable coil at a direction normal to the direction of current flow over a translational distance of the valve stem at least equal to the valve stroke;

a magnetic circuit air gap between the at least one permanent magnet and the stem support ferromagnetic section, the magnetic circuit air gap containing the one or more energizable coils, such that a magnetic flux from the individual permanent magnet produces a Lorentz force on the individual energizable coil when a current flows through the individual energizable coil, and the magnetic circuit air gap providing a uniform separation between the at least one permanent magnet and the stem support ferromagnetic section, wherein the uniform separation is determined over a distance perpendicular to the longitudinal axis;

a spring mechanism biasing the valve stem at a predetermined position when the one or more energizable coils are deenergized; and a valve body having a flow outlet and supporting the valve seat such that the valve seat lies longitudinally between the flow inlet and the flow outlet, the valve body further supporting the stem support and the spring mechanism, and the valve body having a second ferromagnetic section further supporting the at least one permanent magnet, the at least one permanent magnet supported by the second ferromagnetic section such that the at least one permanent magnet separates the second ferromagnetic section and the magnetic circuit air gap.

18. The flow modulation valve of claim 17 wherein the one or more energizable coils is a plurality of energizable coils and wherein the at least one permanent magnet is a plurality of permanent magnets, and the plurality of energizable coils equals the plurality of permanent magnets in number.

19. The flow modulation valve of claim 18 wherein a maximum effective valve travel of the flow modulation valve is greater than the valve stroke, wherein the valve body ferromagnetic section has a thickness in a dimension coincident with or parallel to a vector perpendicular to the longitudinal axis such that the plurality of permanent magnets does not drive the valve body ferromagnetic section into magnetic saturation, and wherein the stem support ferromagnetic section has a thickness in a dimension coincident with or parallel to a vector perpendicular to the longitudinal axis such that the plurality of permanent magnets does not drive the stem support ferromagnetic section into magnetic saturation.

20. The flow modulation valve of claim 19 wherein the plurality of permanent magnets are comprised of individual permanent magnets of a samarium cobalt material, wherein the valve body and the stem support are fabricated from a steel alloy, wherein the valve stem is fabricated from glass mica, and wherein the one or more energizable coils are fabricated using copper wire.

21. The flow modulation valve of claim 19 wherein the valve body is comprised of a valve plug and the valve seat is located on the valve plug, wherein the valve seat has a valve seat cross-section normal to the longitudinal axis and the valve face has a valve face cross-section normal to the longitudinal axis, wherein the valve seat cross-section normal to the longitudinal axis is substantially equivalent to the valve face cross-section normal to the longitudinal axis, and wherein the valve plug is symmetric about a rotational plug axis coincident with the longitudinal axis.

22. The flow modulation valve of claim 21 wherein the valve body is further comprised of a flow outlet casing comprised of the flow outlet and a middle casing, wherein the valve plug is threadably engaged to the flow outlet casing and the middle casing, and wherein the middle casing is threadably engaged to the stem support.

* * * * *

UNITED STATES PATENT AND TRADEMARK OFFICE
CERTIFICATE OF CORRECTION

PATENT NO. : 8,540,209 B2  
APPLICATION NO. : 13/233659  
DATED : September 24, 2013  
INVENTOR(S) : John Peter Hensel et al.

Page 1 of 1

It is certified that error appears in the above-identified patent and that said Letters Patent is hereby corrected as shown below:

In the Specification

Column 5, line 53, "up to and" should read --up to 650°F and--.

Signed and Sealed this  
Thirtieth Day of September, 2014

Michelle K. Lee  
*Deputy Director of the United States Patent and Trademark Office*